March 4, 1941.  H. L. WILCOX  2,233,501
BRAKING SYSTEM FOR INDUCTION MOTORS
Filed Sept. 29, 1939  3 Sheets-Sheet 1
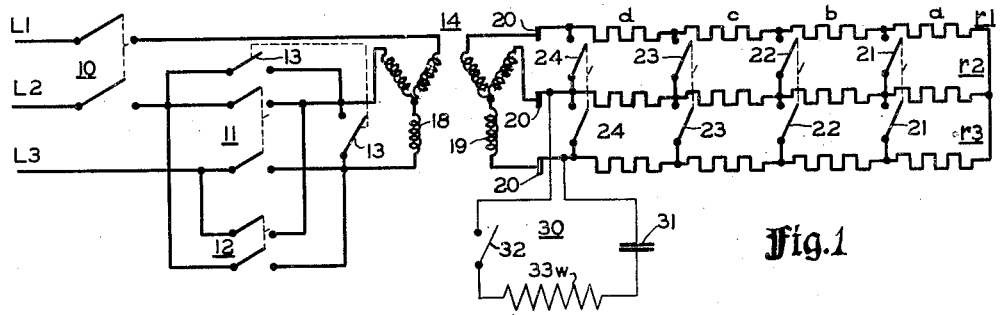
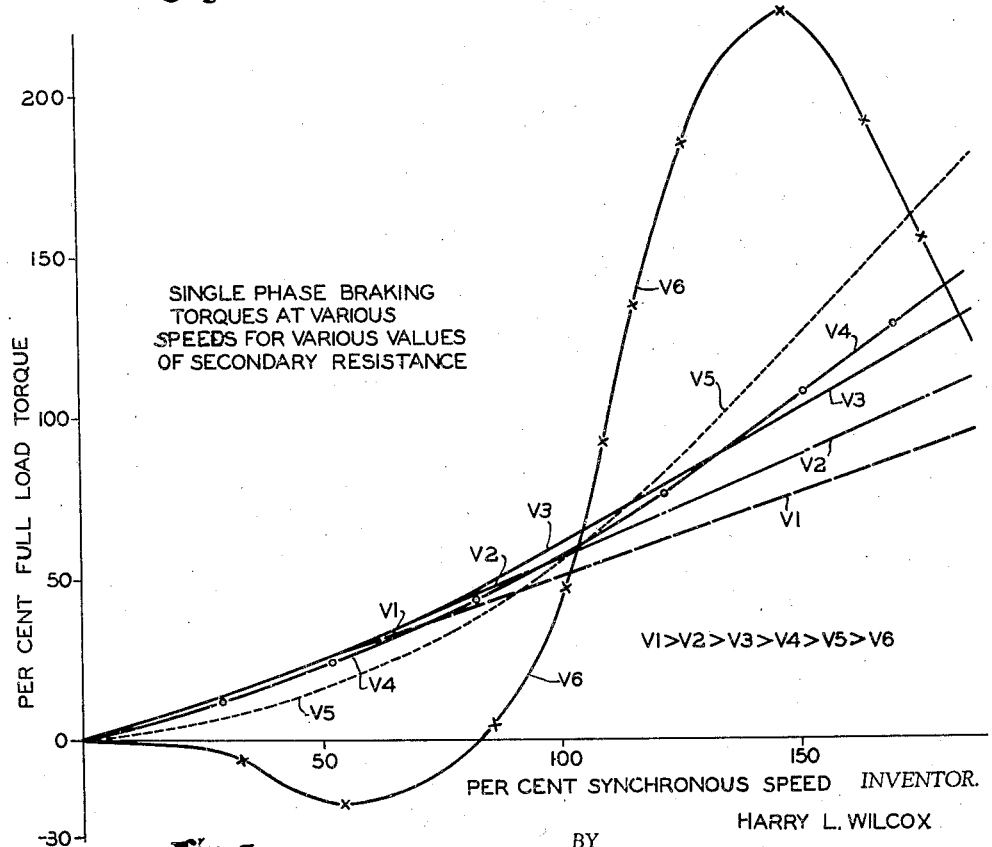
INVENTOR.
HARRY L. WILCOX
BY
HIS ATTORNEY.

March 4, 1941.   H. L. WILCOX   2,233,501
BRAKING SYSTEM FOR INDUCTION MOTORS
Filed Sept. 29, 1939   3 Sheets-Sheet 3

INVENTOR.
HARRY L. WILCOX
BY John H. Leonard
HIS   ATTORNEY.

Patented Mar. 4, 1941

2,233,501

UNITED STATES PATENT OFFICE 2,233,501

BRAKING SYSTEM FOR INDUCTION MOTORS

Harry L. Wilcox, Cleveland, Ohio, assignor to The Electric Controller & Manufacturing Company, Cleveland, Ohio, a corporation of Ohio Application September 29, 1939, Serial No. 297,175

18 Claims. (Cl. 172—179)

This application is a continuation in part of my copending application, Serial No. 225,611, filed August 18, 1938.

This invention relates to a braking system for electric motors, and particularly to a braking system for wound rotor induction motors.

Direct current motors have generally been used for the hoist motion of electrically operated heavy duty cranes because the speed of such motors is easily controlled during both lowering and hoisting of overhauling as well as non-overhauling loads. Any tendency on the part of the load to drive a direct current motor faster than the speed for which it is adjusted is definitely opposed by the characteristics of the motor. For instance, if the load is overhauling, connections can easily be made which cause the motor, regardless of its speed at the instant, to become a generator and hold the overhauling load to within 5 or 10 percent of a predetermined speed. A direct current motor can be made to operate at any definite speed within a wide speed range by merely adjusting the field strength, and for any preselected field strength operates at nearly constant speed regardless of the load. If speeds below the lowest speed obtainable by field control are desired, it is only necessary to insert some resistance in series with the armature or to provide an armature shunt or both.

The polyphase wound rotor induction motor possesses certain advantages over the direct current motor. For example, since the induction motor has no commutator, it is of course free from commutation troubles, and the use of alternating current motors obviates the necessity of a motor generator set or other rectifier in an industrial plant supplied only with alternating current. However, because of the difficulty of providing good speed control, induction motors have not been as widely adapted for driving the hoist motion of electrically operated heavy duty cranes, such as steel mill cranes, as have direct current motors.

The no-load speed of an induction motor depends principally upon the number of poles for which the motor is wound and the frequency of the source of supply, and the speed under loaded conditions depends principally upon the number of poles, the frequency of the source, and the resistance of the rotor circuit. Since the frequency is usually constant and the number of poles is not readily changeable, heretofore no satisfactory method has been available to control the speed of hoist motors when lowering non-overhauling or overhauling loads. The most common method of varying the speed of induction motors under loaded conditions has been to vary the secondary resistance. Increasing the secondary resistance when the motor is loaded causes a proportional reduction in speed, but as soon as the load is removed, the speed approaches the no-load or synchronous speed. If the load is overhauling, the motor runs at speeds in excess of synchronous speed unless some means is provided to prevent such action. The insertion of extra resistance in the rotor circuit under overhauling load conditions at speeds above synchronism results in greater excessive speeds. The usual means of speed control, therefore, are not satisfactory for controlling induction motors subject to overhauling and non-overhauling loads.

The control equipment for the hoist motion of an electric crane of the steel mill type should be capable of providing a variety of different speeds in both directions with a minimum amount of effort and skill on the part of the operator, and the direction and speed should result from a logical movement of the manual control element. For example, such control apparatus should be capable of hoisting various sizes of loads slowly at first, then accelerating by controlled steps to full speed, lowering such loads short distances at slow speeds, lowering longer distances at high speed, and reducing the speed at will before striking the ground or other object. At all times during this sequence, and regardless of the speed of the motor at the instant, a braking means must be readily available, and each step in the sequence should take place as a result of a logical and simple movement of the manual control element, which is generally in the form of an operating lever for a drum or face plate type master switch. Moving the master switch handle further from the off position in either the hoisting or the lowering direction should always increase the speed, while moving it towards the off position should always cause a decrease in the speed regardless of whether the load is overhauling or not or whether the motor is operating above or below synchronous speed. With very little equipment, direct current motors can be made to respond uniformly and logically to the movements of a lever type master switch. Heretofore, various attempts have been made to obtain similar response from wound rotor induction motors.

Proper control of induction motors for the hoisting operation is relatively simple and in most controllers the methods used are substantially similar. The operation in the lowering direction, however, has presented great difficulty. If the load is overhauling and the master switch operated so that downward power is applied to the motor with all of the secondary resistance in the rotor circuit, the motor quickly exceeds synchronous speed, the ultimate speed depending upon the magnitude of the load. If the master switch is then moved to positions which would give higher speeds with non-overhauling loads, the motor, if subjected to an overhauling load, slows down from its super-synchronous speed towards synchronous speed. This response is not desirable since the operator must take into consideration the size of the load before determining which way to move the master switch to give the desired speed control.

One control system commonly employed to provide improved lowering control is known as counter-torque. Generally, in lowering by this system the master switch is first moved to the last position in the lowering direction, no circuits being made or interrupted by the master switch until the last position is reached. At that time downward power is applied and the accelerating contactors are closed in rapid succession to quickly short circuit all of the secondary resistance. When the master switch is moved back to the next to the last position, lowering power is removed and hoisting power applied with all of the accelerating contactors open, resulting in a weak hoisting or counter-torque which tends to decrease the lowering speed. Moving the master switch further toward the off position closes additional accelerating contactors to increase the counter-torque and further decrease or stop the lowering. At standstill it is necessary for the operator to move the master switch quickly to the off position or the counter-torque might cause hoisting of the load. It is obvious that the movements of the load do not logically follow movements of the master switch and that the response of the motor depends largely upon the skill of the operator. Another method which has been used for controlling lowering speeds of alternating current cranes makes use of the generator action present when direct current is supplied to the primary winding of an induction motor when the rotor is revolving. The necessity of a source of direct current is an obvious disadvantage of such systems. It is an object of this invention to provide a simple speed control means for a polyphase induction motor which is effective throughout a range of speeds from standstill up to and including synchronous speeds and including over synchronous speeds.

It is a further object of this invention to provide a control system for an alternating current crane hoist motor which permits definite speed control both below and above synchronous speed and in both the lowering and the hoisting directions regardless of whether the load is overhauling or not.

A further object is to provide a braking torque for an alternating current wound rotor induction motor without resorting to direct current excitation or plugging connections and which is effective throughout the normal speed range both above and below synchronous speeds.

A still further object is to provide a control system for a polyphase induction motor subject to both overhauling and non-overhauling loads which permits the motor to respond logically to movements of the manual control element regardless of the load and the instantaneous speed.

In accordance with this invention, a braking torque is produced by connecting together two terminals of the primary winding of a three-phase wound rotor induction motor having a star connected primary winding and connecting the third terminal and the interconnected terminals to one phase of the three-phase source of supply. The single phase excitation sets up a stationary magnetic field. Current is induced in the revolving secondary winding due to its passing through the stationary field. This current is partially dissipated in the secondary windings and in the external secondary resistance, and, by virtue of transformer action, the induced current in the secondary also induces a circulating current in the closed circuit including the two interconnected legs of the primary winding. This circulating current produces a field which opposes rotation of the rotor. A braking torque is thereby produced and its value at speeds both above and below synchronism and at synchronism may be controlled by regulating the secondary resistance.

By means of similar connections, three phase delta wound motors can be braked by single phase energization. Likewise, six phase motors can be braked by connecting them either as three-phase or double three-phase motors. Braking torques can be similarly produced in using two phase machines by short circuiting one primary phase winding and exciting the other with single phase current. Thus, in each instance, the single phase braking is accomplished by short circuiting a portion of the primary winding and concurrently energizing all or a portion of the primary winding with single phase current.

Another object of this invention is to provide a control system for a polyphase induction motor in which the speed of the motor throughout its normal speed range both above and below synchronism is controlled by the application of single phase power to the primary winding.

A further object of this invention is to provide a means responsive to the electrical condition of the secondary winding of a wound rotor induction motor to insure proper operating speeds regardless of the size of the load.

Other objects and advantages will become apparent from the following specification, wherein reference is made to the drawings, in which:

Fig. 1 is a diagrammatic illustration of the control system of the present invention;

Fig. 2 is a diagram indicating the position of the contactors for the various master switch positions during a hoisting operation;

Fig. 3 is a similar diagram indicating the position of the contactors during a lowering operation;

Fig. 5 is a graph showing the relation between braking torque and speed obtainable by this invention for various values of rotor resistance both below and above synchronous speeds.

Figure 4:
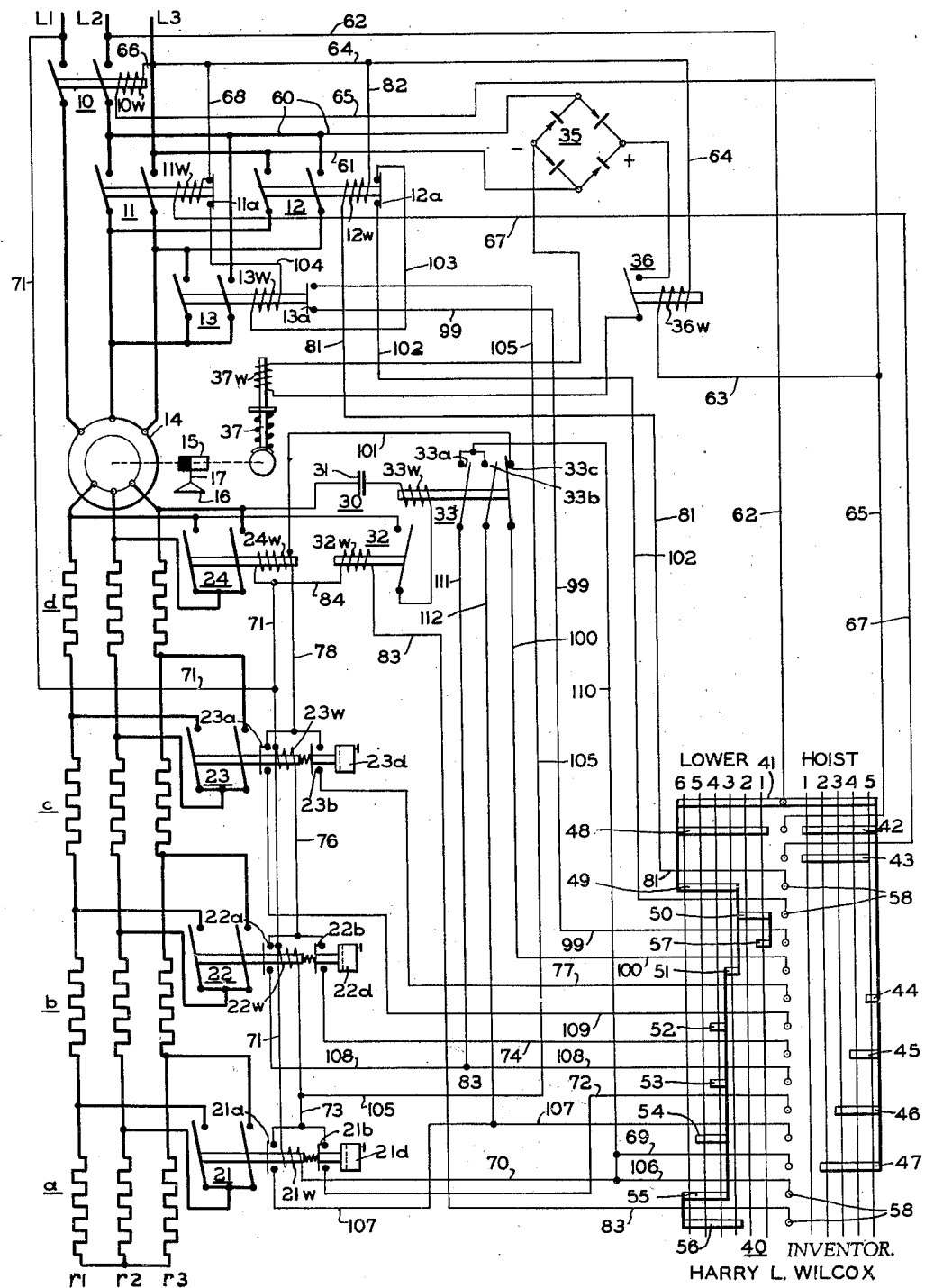
Fig. 4 is a wiring diagram showing the application of a method of automatic operation of the system disclosed in Fig. 1 and the switching sequence indicated in Figs. 2 and 3.

In Fig. 1, for simplicity of explanation, the contactors shown in Fig. 4 are illustrated as knife switches, and similar elements in Figs. 1 and 4 are referred to by means of the same reference numerals. Three conductors L1, L2 and L3 indicate a source of alternating current supply for a three-phase wound rotor induction motor 14 having a star connected primary winding 18 and a secondary winding 19. The contactor 10 when closed connects the conductor L1 to one terminal of the primary winding 18 and the conductor L2 to one side of a contactor 11. The contactor 11 when closed connects the conductor L3 to one terminal of the primary winding 18 and also connects the conductor L2 to the third terminal of the primary winding 18 if the contactor 10 is in the closed position. When the contactors 10 and 11 are closed, the motor 14 rotates so as to hoist a load 16 (Fig. 4) suspended from a cable 17 wound on a drum 15.

A contactor 12 when closed concurrently with the contactor 10 connects the conductors L2 and L3 to the primary winding 18 in an opposite manner than when the contactor 11 is closed, thereby causing the motor 14 to rotate so as to lower the load 16.

The contactor 13 when closed makes the primary connections for single-phase braking of the motor 14 by connecting two terminals of the primary winding 18 together and by by-passing one of the contacts of each of the contactors 11 and 12 to connect the interconnected terminals to the conductor L2 through the contactor 10. The third terminal of the primary winding 18 is connected to the conductor L1 by means of the contactor 10 to complete the braking connections.

The secondary winding 19 of the induction motor 14 may be either delta or star wound and is shown connected by means of slip-rings 20 to a star-connected resistance bank having three branches r1, r2 and r3. Each of the three resistance branches r1, r2 and r3 comprises four resistance sections, a, b, c and d connected in series. A contactor 21 when closed short circuits the section a, a contactor 22 when closed short circuits the sections a and b, a contactor 23 when closed short circuits the sections a, b and c, and a contactor 24 when closed short circuits the sections a, b, c and d.

Although in the illustrative embodiment the primary winding is shown as the stator and the secondary winding as the rotor, it is obvious from a study of the following description, that if the primary winding were the rotating winding and the secondary winding were stationary, similar operation would result.

In order to provide automatic supervision of the speed of the motor 14 a relay circuit 30, comprising a condenser 31 connected in series with an operating winding 33w of a control relay 33 (Fig. 4), is connected across two of the slip-rings 20. At any particular speed the frequency of the secondary current of an induction motor has a definite value, being equal to line frequency at standstill and zero at synchronous speed. The induced voltage likewise varies from a maximum at standstill to zero at synchronous speed. Above synchronous speed regeneration occurs, the voltage and frequency of the induced secondary current increasing in proportion to the speed, the frequency becoming again equal to line frequency at 200 percent synchronous speed. Since the decreasing frequency tends to increase the relay current and the decreasing voltage tends to decrease the relay current, resulting in a substantially constant current condition, an ordinary inductive relay connected across the slip-rings does not give a proper response. Likewise, above synchronous speed the increasing frequency and increasing voltage result in a relatively constant current condition in any inductive circuit connected to the rotor circuit.

The relay circuit 30 is fully described in Patent No. 2,165,491 issued to John D. Leitch on July 11, 1939. It is sufficient here to point out that the circuit 30 is responsive to operate the relay 33 in accordance with the electrical condition of the rotor winding due to the phenomenon of series resonance which causes a distinct drop in the relay current at a predetermined secondary frequency, depending upon the capacitance of the condenser 31 and the inductance of the winding 33w. The addition of the condenser to the circuit makes the relay circuit capacitive at certain frequencies and removes the tendency toward constant current inherent in a purely inductive circuit. The electrical connection of the relay circuit 30 to the slip-rings is controlled by a contactor 32.

In Figs. 2 and 3, the solid dots indicate the contactors which are closed in response to movement of a master switch to the various positions, while the circles indicate the contactors which close in response to operation of the relay 33.

When it is desired to hoist the load 16, the contactors 10 and 11 may be closed to supply three-phase power to the primary winding of the motor 14 by moving a master control element or master switch 40 (Fig. 4) to the first position in the hoisting direction. At this time the sections a, b, c and d of each of the resistance branches r1, r2 and r3 are effective in the secondary circuit and the motor exerts a small torque in the hoisting direction. In the second position hoisting the contactor 21 is closed (Fig. 2) to short circuit the resistance sections a, causing an increase in the hoisting torque of the motor 14. If the load 16 has started to move in the first position, its speed is increased in the second position. In the third position hoisting the contactor 22 is closed to short circuit both resistance sections a and b, resulting in a further increase in speed. In the fourth position of hoisting the contactor 23 closes, and in the fifth position the contactor 24 closes thus giving uniform increments of speed change. The switching sequence so far described is standard practice and no claim of any novelty as to it is herein made.

In the lowering direction, however, merely selectively short-circuiting predetermined amounts of the resistances r1, r2 and r3 does not give proper operation. However, the novel switching sequence now to be described, reference being made to Figs. 1 and 3, provides proper speed control in response to logical movements of the controller handle.

In the first position lowering the contactors 10, 13 and 22 are closed. If a non-overhauling load is to be lowered, no movement occurs since the motor 14 is energized only by single-phase current and can exert no torque. However, if the load 16 is large enough to overcome the static friction of the motor 14 and the accompanying gearing and shafting, the load 16 moves downward. If it were not for the connection made by the contactor 13 and the single-phase excitation, the motor 14 would accelerate to a speed above synchronous speed. Due to the short circuiting of a portion of the primary winding 18 by the contactor 13 and the concurrent single-phase excitation of the primary winding 18, and also the closing of the secondary or rotor circuit through a predetermined resistance by the contactor 22, the kinetic energy of the rotor of the motor 14 is translated into electrical energy which additionally energizes the short circuited portion of the primary winding in a manner to oppose rotation of the rotor due to generator action. The flow of current in the short circuited portion of the primary winding 18 causes a corresponding increase in the secondary or rotor current. The kinetic energy of the rotor of the motor 14 is thus dissipated in the short circuited primary windings and in the secondary circuit including the external resistance sections c and d. A braking torque is thereby produced which limits the speed of the motor 14 to a safe value. With certain amounts of resistance in the secondary circuit the braking torque increases almost directly with the motor speed until speeds greatly in excess of synchronism are reached, as shown by curves V1, V2 and V3 of Fig. 5. When a certain speed greatly in excess of synchronism is reached, the speed-torque curve for any particular value of secondary resistance will reach a maximum and then decline as the speed increases further. The lower the secondary resistance the lower the speed at which these maxima occur. In Fig. 5, the curves V1 and V6 represent speed-torque characteristics for various values of total secondary resistance which are related in magnitude as indicated.

There is a certain value of total secondary circuit resistance for each motor which gives the highest average braking torque and the best speed torque characteristic during braking, and increasing or decreasing the total secondary resistance above or below this optimum value either reduces the average braking torque or gives a speed torque characteristic which is not as desirable throughout its entire range. This is clear from the curves of Fig. 5. In the case of one of the motors from which the data to plot these curves was obtained, an external secondary resistance of 5.7 times the internal resistance gave the highest average braking torque over a range of speeds of zero to synchronous speed and also gave a sufficiently high average braking torque over a range of speeds from synchronism to 150% of synchronism. Tests also indicate that this optimum value of rotor resistance is the same value which gives maximum pull out torque for the motor at 200% slip while connected in the normal manner to a three-phase source. Experiments have demonstrated that, if the load is equal to the rated load of the motor, by selecting the resistance section c and d so that the total rotor resistance with the contactor 22 closed is equal to the optimum value, the lowering speed is approximately 60% of synchronous speed. The speed-torque curve under this condition is represented by the curve V3 of Fig. 5.

If an increased lowering speed is desired, the master switch may be moved to the second position in the lowering direction. When the master switch is moved to the second position, the contactor 22 opens and the contactors 10 and 18 remain closed, as indicated in Fig. 3. Opening of the contactor 22 inserts the resistance sections a and b into the rotor circuit together with the sections c and d so that the total value of rotor resistance is increased. The amount of this increase may be such that the torque-speed characteristic is similar to curve V1 of Fig. 5. This increase in rotor resistance causes a decrease in braking torque and results in an increase in speed for overhauling loads. If the motor is lowering a load equal to full load of the motor, the speed increases to approximately 80% of synchronous speed.

Thus a speed change from 60% to 80% of synchronous speed results from an increase in rotor resistance. If lighter overhauling loads are being lowered, the speed is less, but the increases are somewhat in proportion.

If, because of its size, the load 16 does not move downward rapidly enough in the second position lowering, a third position of lowering may be resorted to, in which event the contactor 18 is opened and the contactors 12 and 32 are closed. Closure of the contactor 12 completes the normal three-phase connections from the source of power to the primary winding 18, and the motor exerts a downward torque. If the load 16 should now cause the motor to accelerate to more than a predetermined percentage of its synchronous speed, for example, 50% of synchronous speed, or if the speed is already above the predetermined percentage of synchronous speed, the contactor 24 closes in response to operation of the frequency relay 33. The closure of the contactor 24 short circuits all of the resistances r1, r2, and r3 and prevents too great a speed of the motor 14, the speed with the contactor 24 closed for overhauling loads being slightly above synchronous speed, and for non-overhauling loads slightly below synchronous speed.

By moving the master switch repeatedly from the off position to the first position lowering, the average speed of heavy overhauling loads may be readily maintained at an extremely low value, by moving the master switch from the first position to the second position, a higher average speed may be maintained, and by moving the master switch from the second position to the third position, a still higher average lowering speed for overhauling loads may be obtained and non-overhauling loads may be moved downwardly slowly.

If the master switch is in the third position, and if the load is insufficient to cause the motor to accelerate to the predetermined speed for which the relay 33 is adjusted, or if the master switch is not left in the third position long enough for the speed of the motor 14 to increase sufficiently to operate the relay 33 to cause closure of the contactor 24, and it is desired to lower a load more rapidly, the master switch may be moved to the fourth position, causing the closure of the contactors 21, 22, 23 and 24. If the contactor 24 has been closed at the third position by operation of the relay 33, movement to the fourth position causes no change in the secondary resistance. Since all of the external secondary resistance is short circuited when the master switch is in the fourth position lowering, non-overhauling loads are lowered at speeds slightly less than synchronism and overhauling loads at speeds slightly above synchronism.

No speed control of the lowering of non-overhauling loads beyond position three is obtainable nor is such generally desirable, the non-overhauling loads that commonly occur being such that lowering at approximately synchronous speed is satisfactory. If lower speeds are necessary, inching between the second and third positions may be resorted to.

In the fifth position lowering a further increase in speed for overhauling loads takes place since the contactors 23 and 24 are opened to remove the short circuit from the resistance sections c and d. In the sixth position lowering the contactor 22 is opened, removing the short circuit from the resistance section b. If, while the master switch is in the fifth or sixth position, the motor should accelerate to a predetermined maximum supersynchronous speed, for example, 150% of synchronous speed, the relay 33 operates to close contactor 23, or contactors 22 and 23, to slow the motor towards synchronous speed.

In addition to the braking action at excessive speeds above synchronism resulting from the automatic removal of resistance from the secondary circuit, the braking action of the single phase connections also is potentially effective. For example, if the master switch is in the sixth position, the speed of the motor approximately 150% of synchronous speed, and the master brought back to the first position, a braking torque proportional to the ordinate of the curve V3 at 150% speed is immediately effective and the average braking torque from that speed down to zero is proportional to the area between the curve V3 and the abscissa of zero torque. If the master switch is returned to the second position instead of the first position a lesser value of braking torque is available, and its average value is the area between the curve V1 and the abscissa of zero torque. Fig. 5 illustrates how different values of secondary resistance may be chosen to give a desired braking characteristic throughout all normal speed ranges.

From the foregoing description it is to be noted that heavy overhauling loads are automatically prevented from moving downward too rapidly by means of the frequency relay 33 and that the speed changes in response to controller movements are identical with those which occur with similar controller movements in the hoisting direction. That is, movement of the master switch away from the off position causes increases in speed regardless of load, and movement of the master switch toward the off position causes decreases in speed.

In Fig. 4, the contactor 10 is shown as electromagnetically operable by means of a winding 10w. The contactors 11 and 12 have operating windings 11w and 12w and normally closed auxiliary contacts 11a and 12a, respectively. The contactor 13 has an operating winding 13w and normally open auxiliary contacts 13a. The contactor 24 has an operating winding 24w and the contactors 21, 22 and 23 have operating windings 21w, 22w and 23w, instantaneously responsive normally open auxiliary contacts 21a, 22a and 23a, and time delay, normally open auxiliary contacts 21b, 22b and 23b, respectively. The retardation of each of the contacts 21b, 22b and 23b may be obtained by any suitable means illustrated by respective dash-pots 21d, 22d and 23d.

The master switch 40 comprises a group of hoisting contact segments 42 to 47 and a group of lowering contact segments 48 to 57 and a common contact segment 41. A group of circuit terminal contacts 58 may be selectively moved to the various positions 1 to 5 in the hoisting direction to contact the various segments 41 to 47 or to the various positions 1 to 6 in the lowering direction to contact the various segments 41 and 48 to 57.

The frequency relay circuit 30, comprising the condenser 31 and the operating winding 33w, controls the operation of the relay 33 which has normally open contacts 33a and 33b and normally closed contacts 33c. The contactor 32, which controls the connection of the relay circuit 30 to the rotor circuit, has an operating winding 32w.

A spring applied brake 37 is releasable upon energization of its operating winding 37w, which is connectible through a contactor 36, having an operating winding 36w, to the direct current terminals of a full-wave rectifier shown diagrammatically at 35. The brake 37 may be of any type which is released upon energization of an electrical operating means and is hereinafter referred to as a mechanical brake to distinguish it from the electrical braking action of the motor itself. The alternating current terminals of the rectifier 35 are connected to the conductors L2 and L3 by means of conductors 60 and 61.

The operation of the control system shown in Fig. 4 in the hoisting direction will now be described.

Movement of the master switch 40 to the first position in the hoisting direction causes energization of the operating windings 10w, 11w and 36w of the contactors 10, 11 and 36, respectively. The operating windings 10w and 36w are connected in parallel and the circuits therethrough are from the conductor 12 through a conductor 62, a circuit terminal 58 of the master switch 40, the segment 41, the segment 42, another of the circuit terminals 58, a conductor 65, a conductor 63, the winding 36w, a conductor 64 to the conductor L3, and from the conductor 65 to the winding 10w and a conductor 66 to the conductor L3. The energizing circuit for the winding 11w is from the energized segment 41 to the segment 43, and through a conductor 67, the winding 11w, a conductor 68 and the conductor 64 to the conductor L3. The contactors 10 and 11 in response to the energization of their operating windings 10w and 11w close their contacts to supply three-phase power to the primary winding 18 of the motor 14 which thereupon exerts torque in the hoisting direction. The closure of the contactor 10 supplies alternating current to the rectifier 35 over the conductors 60 and 61, and the closure of the contactor 36, in response to the energization of its operating winding 36w, completes a direct current circuit to the winding 37w which causes release of the brake 37.

To increase the speed of the hoisting operation or to increase the hoisting torque, if the torque exerted in the first position is insufficient to move the load, the master switch 40 may be moved to the second position in the hoisting direction. When the master switch is in the second position, the winding 21w of the accelerating contactor 21 is energized over a circuit from the energized segment 41 to the segment 47 and through conductors 69 and 70, the winding 21w and a conductor 71 to the conductor L1. The accelerating contactor 21, in response to energization of its operating winding 21w, closes its main contacts to short circuit the resistance sections a of the resistance branches r1, r2, and r3.

After a time delay sufficient to permit closure of the contacts 21b, movement of the master switch 40 to the third position in the hoisting direction causes the energization of the operating winding 22w of the accelerating contactor 22 over a circuit extending from the energized segment 41 to the segment 46 and through a conductor 72, the now closed contacts 21b of the contactor 21, a conductor 73, the operating winding 22w and the conductor 71 to the conductor L1. The contactor 22 in response to energization of its operating winding 22w closes its main contacts to short-circuit the section b in addition to the section a of the resistance branches r1, r2, and r3.

After a time delay, a further increase in speed is obtainable by moving the master switch 40 to the fourth position in the hoisting direction thereby causing energization of the operating winding 23w of the accelerating contactor 23 over a circuit from the energized segment 41 to the segment 45 and through a conductor 74, the now closed contacts 22b of the contactor 22, a conductor 76, the winding 23w, and the conductor 71 to the conductor L1. The contactor 23 in response to the energization of its operating winding 23w closes its main contacts to short circuit resistance sections a, b and c of the resistance branches r1, r2, and r3.

Energization of the operating winding 24w of the accelerating contactor 24 is caused when the master switch 40 is moved to the fifth position in the hoisting direction over a circuit from the energized segment 41 to the segment 44 and through a conductor 77, the now closed contacts 23b of the contactor 23, a conductor 78, the winding 24w, and the conductor 71 to the conductor L1. The contactor 24, in response to the energization of its operating winding 23w, closes its contacts to short circuit all of the resistance in the three branches r1, r2 and r3.

It is apparent that the accelerating contactors 22, 23 and 24 close in response to the energization of their operating windings 22w, 23w and 24w, after time delay intervals due to the time delay action of the contacts 21b, 22b and 23b occasioned by the dash-pots 21d, 22d and 23d. If the master switch 40 were moved quickly to the fifth position in the hoisting direction, the time delay action provides a proper acceleration rate for the induction motor 14 in a manner well understood.

The operation of the control system shown in Fig. 4 in the lowering direction will now be described.

When the master switch 40 is moved to the first position in the lowering direction, the contactors 10, 13, 22 and 36 close, due to energization of their respective operating windings 10w, 13w, 22w and 36w. The energizing circuit for the operating winding 10w of the contactor 10 is from the energized segment 41 to the segment 48 and through the conductor 65, the winding 10w and the conductor 66 to the conductor L3. The energizing circuit for the winding 36w of the contactor 36 is traceable from the energized conductor 65 through the conductor 63, the winding 36w, and the conductor 64 to the conductor L3.

The energizing circuit for the operating winding 13w of the contactor 13 is from the energized segment 41 to the segment 50 and through a conductor 102, the normally closed contacts 12a of the contactor 12, a conductor 103, the winding 13w, a conductor 104, the normally closed contacts 11a of the contactor 11, and the conductors 68 and 64 to the conductor L3. The energizing circuit for the winding 22w of the contactor 22 is from the energized segment 41 to the segment 57 and through the conductor 99, the now closed contacts 13a of the contactor 13, a conductor 105, the conductor 73, the winding 22w, and the conductor 71 to the conductor L1.

The closure of the contactor 36 in response to energization of its operating winding 36w completes the circuit to the operating winding 37w of the brake 37 which is thereby released.

With the contactors 10 and 13 closed, two terminals of the primary winding of the motor 14 are connected together and the interconnected terminals connected to the conductor L2 and the third terminal of the primary winding of the motor 14 is connected to the conductor L1. The resistance sections c and d remain in the secondary circuit, the sections a and b being short circuited by the contacts of the contactor 22. If a non-overhauling load is connected to the hoist, no movement will occur since the single-phase supplied to the primary winding will cause no torque. If, however, an overhauling load is connected to the hoist, it moves downward in opposition to the braking torque of the single-phase connection and reaches a stable speed either above or below the synchronous speed of the induction motor. If it is desired to maintain the average speed of the load at a still lower value, the master switch may be repeatedly moved between the off position and the first lowering position, thus intermittently applying the mechanical brake 37 which tends to stop the load entirely, and intermittently applying single-phase braking, which tends to permit a slow movement of the load.

Movement of the master switch to the second position in the lowering direction causes the de-energization of the operating winding 22w of the contactor 22 which thereupon opens to insert additional resistance sections a and b into the rotor circuit. As a result, the braking torque is reduced, and the lowering speeds of all overhauling loads increase. The braking torque has been reduced from that indicated by the curve V2 of Fig. 5 to that indicated by the curve V1. Examination of these curves shows that the braking torque is effective at speeds above synchronism as well as at speeds below synchronism, gradually increasing as the motor speed increases. This gradual increase in braking torque at speeds above synchronism permits very definite speed control since any tendency for the motor to go faster is immediately opposed by an increased braking torque.

Movement of the master switch to the third position in the lowering direction causes the de-energization of the operating winding 13w of the contactor 13 and energization of the operating windings 12w and 32w of the contactors 12 and 32, respectively. The contactor 10 remains closed. The energizing circuit for the winding 12w is from the energized segment 41 to the segment 49 and through a conductor 81, the winding 12w, a conductor 82, and the conductor 64 to the conductor L3. The energizing circuit for the winding 32w of the contactor 32 is from the energized segment 41 to the segment 56 and through a conductor 83, the winding 32w, a conductor 84 and the conductor 71 to the conductor L1. Opening of the contactor 13 removes the single-phase braking from the motor 14 and the closing of the contactor 12 applies three-phase power and causes a downward torque to be exerted. Closure of the contactor 32 connects the relay circuit 30 across two of the slip-rings 26 which, at speeds below 50% of synchronous speed, causes the winding 33w to be energized to cause operation of the relay 33.

Since all of the external resistance r1, r2 and r3 is connected in the rotor circuit of the motor 14, an overhauling load causes the motor to accelerate toward synchronous speed. As soon as the speed of the motor reaches a predetermined speed, for example, 50% of synchronous speed, or if the speed is already above 50% of synchronism, the relay 33 operates to energize the operating winding 24w of the contactor 24. The energizing circuit for the winding 24w is from the energized segment 41 to the segment 51 and through a conductor 100, the now closed contacts 33c of the relay 33, a conductor 101, the winding 24w, and the conductor 71 to the conductor L1. The closing of the conductor 24 in response to the energization of its operating winding 24w short circuits all of the external rotor resistances r1, r2 and r3. Overhauling loads under this condition move downward at speeds slightly above synchronous speed and light loads move downward at speeds slightly below synchronism.

If the speed of the motor in the third position lowering is such that the contactor 24 has not closed, the movement of the master switch to the fourth position causes an increase in speed due to the closure of the contactors 21, 22, 23, and 24 and consequent short circuiting of all of the secondary resistance. If the contactor 24 already has closed by virtue of the operation of the relay 33, the movement of the master switch to the fourth position does not alter the speed of the load, but merely causes closure of the contactors 21, 22 and 23.

The energizing circuit for the contactor 21 is from the energized segment 41 to the segment 55 and through a conductor 106, the conductor 76, the winding 21w, and the conductor 71 to the conductor L1. The energizing circuit for the winding 22w of the contactor 22 is from the energized segment 41 to the segment 54 and through a conductor 107, the now closed contacts 21a of the contactor 21, the conductor 73, the winding 22w and the conductor 71 to the conductor L1. The energizing circuit for the winding 23w of the contactor 23 is from the energized segment 41 to the segment 53 and through a conductor 108, the now closed contacts 22a of the contactor 22, the conductor 76, the winding 23w and the conductor 71 to the conductor L1. The energizing circuit for the winding 24w which is independent of the relay 33 is from the energized segment 41 to the segment 52 and through a conductor 109, the now closed contacts 23a of the contactor 23, the conductor 78, the winding 24w and the conductor 71 to the conductor L1.

If the master switch is now moved to the fifth position in the lowering direction, a further increase in the speed of overhauling loads takes place due to the fact that the contactors 23 and 24 are opened as a result of the deenergization of their operating windings 23w and 24w to reinsert the resistance sections c and d into the rotor circuit.

If the speed of the motor should reach 150% of its synchronous speed with the master switch 40 in the fifth position, the relay circuit 30 causes operation of the relay 33, resulting in closure of the contacts 33a and 33b. The closure of the contacts 33a at this time completes a circuit to the winding 23w which is traceable from the energized segment 41 to the segment 55 and through the conductors 106 and 110, the contacts 33a, a conductor 111, the conductor 108, the closed contacts 22a, the conductor 76, the winding 23w and the conductor 71 to the conductor L1. The contactor 23, in response to the energization of its operating winding 23w, closes its contacts to again short circuit resistance section c to reduce the speed of the motor and maintain the speed below 150% of synchronous speed.

If, with the master switch in the fifth position in the lowering direction, the load is not such as to cause speeds in excess of 150% synchronous speed, further increases in speed may be obtained by moving the master switch 40 to the sixth position, causing deenergization of the winding 22w and consequent opening of the contactor 22. The opening of the contactor 22 reinserts resistance sections b into the rotor circuit. If the speed at the sixth position increases above 150% of synchronous speed, the relay circuit 30 causes energization of the winding 33w and consequent closure of the contacts 33b of the relay 33. Closure of the contacts 33b completes a circuit to the winding 22w from the now energized conductor 110 through the contacts 33b to a conductor 112, the conductor 107, the closed contacts 21a of the contactor 21, the conductor 73, the winding 22w and the conductor 71 to the conductor L1. Energization of the operating winding 22w causes closure of the contactor 22 to again short circuit the resistance sections a and b, resulting in a decrease in speed. As soon as the contacts 22a of the contactor 22 close, contactor 23 will also close, due to energization of its winding over a circuit through the contacts 33a and previously traced in connection with the fifth position lowering. Contactor 23, in response to the energization of its operating winding 23w, closes its contacts to again short circuit the resistance section c to prevent the motor 14 from going above 150% of its synchronous speed.

It is clear from the above description that in the case of overhauling loads, the master switch may be moved from positions one to six to cause gradual increases in speed, provided that a maximum predetermined speed is not exceeded, and that movement of the master switch from the sixth position back toward the off position causes gradual decreases in speed, provided that the maximum predetermined speed has not been reached.

In the described system, when the master switch is in the first or second position of lowering, no downward torque is exerted. In the third position a downward torque is exerted, with all of the external rotor resistance in the circuit. Since non-overhauling loads require but slight downward torque, if the master switch is left in the third position, the speed generally immediately approaches synchronism. Slower average speeds may be maintained by repeatedly moving the master switch between the second and third positions. With the motor exerting but little torque, increasing or decreasing the secondary resistance has no appreciable effect on the speed. The important thing is that by moving the master switch away from the off position to the third position, an increase in speed takes place, for both overhauling and non-overhauling loads, and by moving the master switch from the third position toward the off position, a decrease in speed takes place for both overhauling and non-overhauling loads.

Although the description has assumed that the master switch is moved slowly from point to point, in actual practice it may be moved rapidly from the off point to the sixth point lowering, and the described sequence will take place due to the interlocking contacts in a manner well understood.

Although single-phase braking has been shown as effective at only two master switch positions, further speed control for overhauling loads can be obtained by providing more positions of single-phase excitation, each with a different amount of external secondary resistance to predetermine the braking torque. Fig. 5 shows that a reduction in the amount of secondary resistance with single-phase braking connections established causes an increase in braking torque up to a certain point beyond which further reduction causes a decrease in braking torque at speeds below synchronism, and an increase in braking torque at speeds above synchronism. The proper value of secondary resistance to use for any particular master switch position can be found easily by experiment. For example, one of the motors in the experiments which resulted in the data used to plot the curves of Fig. 5, required 3.4 ohms of external resistance to give a braking characteristic corresponding to curve V3 and 7.7 ohms to give a braking characteristic corresponding to curve VI.

Although in Fig. 4 the mechanical brake 37 is operated by direct current obtained from the rectifier 35, other types of mechanical brakes can be used, but, since there is no necessity of having a source of direct current available, these other types of brakes may be operated most conveniently by alternating current. All alternating current brakes have the disadvantage of being slow-setting, that is, when the current through the operating winding is interrupted, a few seconds elapse before the brake shoes contact the brake drum with sufficient pressure to cause a braking action. Reference to Fig. 4 shows that when the master switch 40 is moved from the first position in the lowering direction to the off-position, the single-phase braking circuits and the circuit to the winding 37w of the brake 37 are interrupted simultaneously. As a result there is an interval during which no braking force is effective on the motor 14, the duration of the non-braking interval depending upon the time it takes for the brake 37 to set. In direct current crane control this condition of non-braking is not present due to the fact that the dynamic braking circuit is maintained closed while the master switch is in the off-position. However, due to power losses, it is not desirable in the case of single-phase braking to have the braking circuits effective at all times while the master switch is in the off-position.

Figure 6:
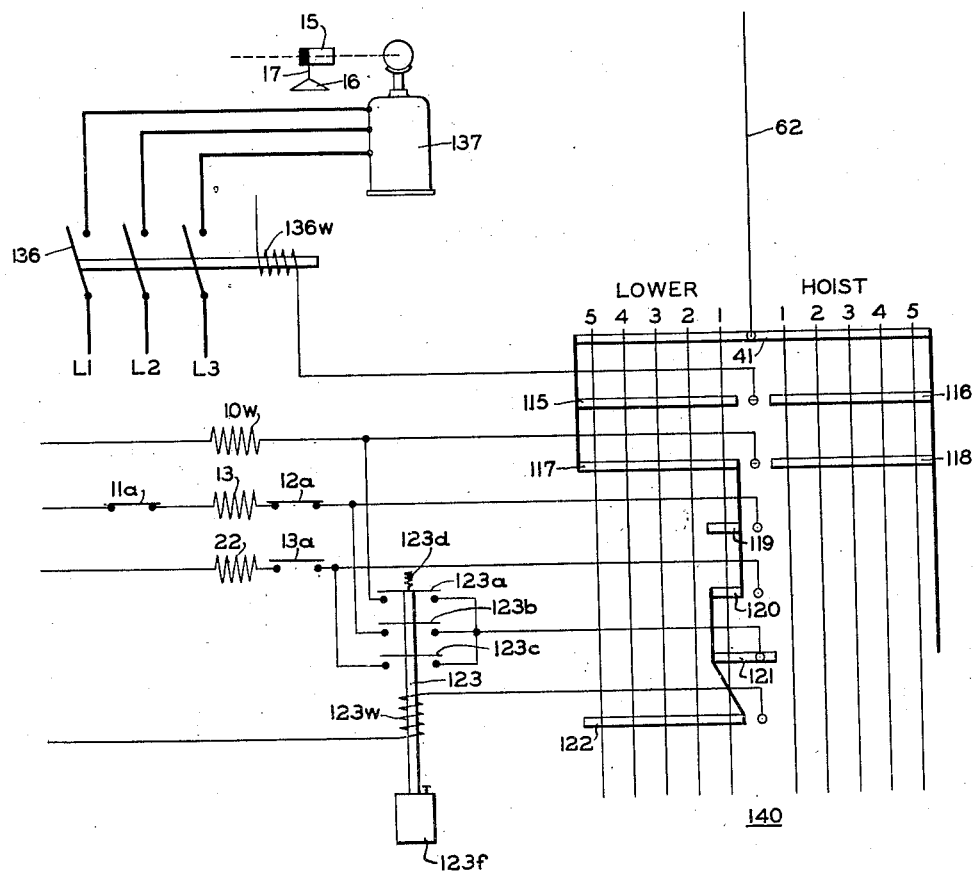
Fig. 6 is a wiring diagram showing a portion of a modified master switch and certain associated elements which can be substituted for the corresponding portion of the master switch of Fig. 4.

The modification shown in Fig. 6 illustrates how the controller of Fig. 4 may be changed so that the single phase braking torque is effective during the entire interval of switching from the first position lowering to the off-position and until the mechanical brake sets.

In Fig. 6, elements similar to those in Figs. 1 and 4 are referred to by the same numerals. A portion only of a master switch 140 is illustrated and includes contact segments 41 and 115 to 122, it being understood that the remaining portion of the master switch 140 and the connections to the control circuits for the motor 14 may be the same as the corresponding portion of the master switch 40 and corresponding connections of Fig. 4. The contact segments 115 and 116 control the energization of a winding 136w of a contactor 136 which in turn controls the operation of the mechanical brake 137. The brake 137 is diagrammatically illustrated as an alternating current brake which sets to stop the motor 14 upon interruption of the power supply by the contactor 136. The contact segments 117 and 118 control the energization of the operating winding 10w of the contactor 10, and the contact segments 119 and 120 control the energization of the operating windings 13w and 22w respectively of the contactors 13 and 22 respectively. A time delay relay 123 is provided having an operating winding 123w and three pairs of normally open contacts 123a, 123b and 123c which are held in the open position by means of a spring 123d and which are delayed in opening after deenergization of the winding 123w by means of a time delay device shown as a dashpot 123f. The winding 123w is energized in all lowering positions through the contact segment 122. The windings 10w, 13w and 22w may be energized independently of the contact segments 117, 118, 119 and 120 through the contact segment 121 and the contacts 123a, 123b and 123c, respectively, of relay 123.

Only one position of single phase braking is provided on the master switch 140, but, when it and the associated circuits are substituted for the corresponding portion of the master switch 40 and associated circuits of Fig. 4, the operation otherwise is the same as that of Fig. 4 except for the changes effected by the inclusion of the time delay relay 123. Movement of the master switch 140 from the off-position to the first position in the lowering direction causes energization of the operating windings 136w, 10w, 13w and 22w. The mechanical brake 137 is released upon energization of the winding 136w and consequent closure of the contactor 136 and the connections for single phase braking are set up by the operation of the contactors 10, 13 and 22 in the same manner as in the case of the use of the master switch 40. Also, in the first lowering position, the winding 123w of the relay 123 is energized and the contacts 123a, 123b and 123c are instantly closed. Movement of the master switch 140 to the second lowering position applies downward power to the motor 14, and movement to subsequent positions in the lowering direction varies the secondary resistance of the motor 14 in the same manner as described in connection with the master switch 40. In the second and subsequent lowering position the contactor 13 is open and the energization of the winding 22w of the contactor 22 is controlled by the contact segments 46 and 54 and the interlock contacts 21a and 21b of the accelerating contactor 21. The winding 123w remains energized in all lowering positions through the contact segment 122, but the closed contacts of the relay 123 are of no effect in positions other than the first lowering position and the off-position since the contact segment 121 is in contact with a terminal 58 only in the off-position and the first lowering position of the master switch 140.

Assuming that the load is moving downward, and it is desired to stop its movement, the master switch may be returned to the off-position. When in the off-position the winding 123w is deenergized, but the contacts of the relay 123 remain closed, due to the time delay action of the dash pot 123f, and complete a circuit through the segment 121 to the windings 10w, 13w and 22w. As a result the single phase braking connections remain effective to cause a braking action during the setting interval of the mechanical brake 137 which begins to set due to the deenergization of the winding 136w as a result of the movement of the master switch 140 to the off-position. The time delay period of the relay 123 is adjusted so that the contacts 123a, 123b and 123c open as soon as the mechanical brake 137 operates to hold the load, and, since the single phase braking connections remain until the relay 123 opens its contacts, there is no lack of braking force during the setting interval of the mechanical brake 137.

Having thus described my invention, I claim:

1. The combination with a three-phase dynamo electric machine having a primary winding which is a secondary winding connected in a closed circuit, a source of three-phase power, means operable for connecting two branches of said primary winding in parallel with each other and both in series with the third branch, the series parallel combination being connectable across one phase of said source, of a resistor in said closed circuit, means to remove the resistor from a closed circuit while maintaining said circuit closed to permit said dynamo electric machine to operate as a motor, and means for connecting said primary winding in star to said three phase source of power to cause rotation of said dynamo electric machine as a motor, whereby the dynamo electric machine operates efficiently connected as a motor throughout an unbroken range from zero speed to and including over-synchronous speeds and operates efficiently as a brake throughout an unbroken range from speeds above synchronous speeds to zero speed.

2. In a braking system for a polyphase induction motor having a primary circuit and a secondary circuit including a secondary winding and an adjustable resistance and being subject to overhauling loads, means to connect the primary circuit to a polyphase source of supply to cause a motor torque for assisting rotation of said motor in the direction of the overhauling torque created by said overhauling loads, means to short circuit a portion of said primary circuit and to connect at least a portion of the primary circuit to a single phase source of current to cause a braking torque opposite to the torque created by said overhauling load, and means operable when the motor is connected to produce a motor torque to vary the adjustable resistance to control the amount of said motor torque and operable when the motor is connected to produce a braking torque to vary the adjustable resistance to control the amount of said braking torque.

3. A control system for a wound rotor induction motor subject to overhauling loads and having a star-connected primary winding arranged for connection to a three-phase source of power having three output conductors, a master control element movable to several sequential motor control positions, movement of said element in one direction causing it to attain each of said positions in a predetermined sequence, means operable when said element is in the first position to maintain said primary winding disconnected from said source, means operative when said master control element is in the next sequential position to connect two non-neutral terminals of said primary winding to one of said conductors and to connect the other non-neutral terminal of said primary winding to another of said conductors to produce a braking torque on said rotor, and means operative when said master control element is in the next sequential position to connect said primary winding to said three-phase source in a manner to cause a torque to be exerted on said rotor to assist the torque of said overhauling load.

4. A control system for an induction motor subject to overhauling loads and having a polyphase primary circuit and a secondary circuit, and arranged for connection to a polyphase source of power, an adjustable resistance for the secondary circuit, a master control element movable to several sequential motor control positions, movement of said element in one direction causing it to attain each of said positions in a predetermined sequence, an electrically operable mechanical brake, means operative when said master control element is in the first sequential position to apply said mechanical brake to hold said load at standstill, means operative when said master control element is in the next sequential position to release said mechanical brake, to short circuit a portion of said primary circuit, to energize at least a portion of said primary circuit with single phase current from said three-phase source of power, and to associate said adjustable resistance with the secondary winding, whereby a braking torque is produced, and means operative when said master control element is in the next sequential position to connect said primary winding in star to said three-phase source in a manner to cause a torque to be exerted to assist the torque of said overhauling load.

5. A control system for a polyphase wound rotor induction motor subjected to overhauling loads and arranged for connection to a source of current supply for said motor, means to energize the motor with polyphase current from the source of supply, external resistance connected in the rotor circuit of said motor, a master control element, switching means responsive to movements of the master control element in one direction to short circuit said resistance in steps to gradually increase the speed of said motor in a direction opposite to the torque exerted by said overhauling load, and means operable to connect the motor to single-phase source of current in a manner to produce a braking torque, said switching means being responsive to movements of the master control element in another direction to short circuit said resistance in steps and thereby gradually decrease the braking torque of said motor opposing the torque exerted by said overhauling load, whereby the speed of operation of said motor in each direction bears a definite relation to the extent and direction of movement of said master control element.

6. The combination with a polyphase wound rotor induction motor drivingly connected to an overhauling load and arranged for connection to a polyphase source of current, manually operated means for varying the rotor resistance to control the speed of said motor, of means responsive to the electrical condition of the rotor circuit of said motor when the motor is operatively connected to a polyphase source of current for varying the rotor resistance to prevent overspeeding of the motor due to said overhauling load throughout a predetermined range, and means for connecting the motor to a single phase source of current in a manner to produce a braking torque on the rotor within a predetermined range of speeds at least partly beyond said first range.

7. A control system for a polyphase induction motor connected to an overhauling load and having a primary and a secondary circuit and arranged to be connected to a source of polyphase power and comprising an adjustable resistance for the secondary circuit, a master control element movable to several different control positions, means operative when said element is in a first position to set up connections for single phase braking of said motor, means operative when said element is in a second position to connect said motor to said source to cause said motor to exert a torque in the direction of the torque created by said overhauling load and to connect said secondary resistance in said secondary circuit, means responsive to the electrical condition of the secondary circuit to short circuit said secondary resistance if the speed of said motor exceeds a predetermined minimum when said element is in said second position, means responsive to movement of said element to subsequent positions to selectively control the amount of said secondary resistance connected in the secondary circuit, said means which is responsive to the electrical condition of said secondary circuit being operable to short circuit portions of said secondary resistance when the speed of the motor exceeds a second predetermined minimum while said element is in said subsequent positions.

8. A control system for an induction motor drivingly connected to an overhauling load capable of driving said motor at speeds greater than the synchronous speed of said motor, comprising means operable to slow down said motor from speeds greater than said synchronous speed while the motor is being driven by said overhauling load, and means responsive to the electrical condition of the secondary circuit of said motor when said motor is being driven at a predetermined speed greater than said synchronous speed to cause operation of the first mentioned means to slow down said motor.

9. The combination with a polyphase wound rotor induction motor drivingly connected to an overhauling load capable of driving said motor at speeds greater than the synchronous speed of said motor, a resistor normally included in the rotor circuit of said motor, and means operable to exclude said resistor from said rotor circuit, of means responsive to the electrical condition of the rotor circuit when said motor is operating at a predetermined speed above said synchronous speed to cause operation of said first-named means to exclude said resistor from the rotor circuit.

10. In a control system for a polyphase induction motor drivingly connected to an overhauling load, a resistor normally included in the rotor circuit, manual means to connect said motor to a source of power in a manner to produce a motor torque to assist said overhauling load, relay means responsive to the electrical condition of the rotor circuit at a predetermined speed below synchronous speed to exclude said resistor from said rotor circuit, manual means operable to include a portion of said resistor in the rotor circuit regardless of the operation of said relay means, and said relay means being responsive to the electrical condition of the rotor circuit at a predetermined speed above synchronous speed to again exclude said resistor from said rotor circuit.

11. The combination with a polyphase wound rotor induction motor drivingly connected to an overhauling load and arranged for connection to a polyphase source of current and manual operating means for varying the rotor resistance to control the speed of said motor, of means responsive to the electrical condition of the rotor circuit of said motor when the motor is operatively connected to a polyphase source of current and rotating at speeds above synchronism for automatically varying the rotor resistance to prevent over-speeding of the motor due to said overhauling load, and manual means operable while the motor is rotating at speeds above synchronism for connecting the motor to a single phase source of current in a manner to produce a braking torque.

12. The method of electrically braking an induction motor having a polyphase primary winding and a secondary circuit including a rotor winding and an external resistor, while said motor is rotating at speeds throughout a predetermined range above synchronous speed, and comprising short circuiting a portion of the primary winding and, while said portion is short-circuited, connecting at least a portion of the primary winding to a source of single-phase power and, while maintaining said short circuit and said single phase connection, closing the secondary circuit through said external resistor all while said motor is so rotating.

13. The combination with a polyphase wound rotor induction motor drivingly connected to an overhauling load and arranged for connection to a polyphase source of current, manually operated means for varying the rotor resistance to control the speed of said motor, and means responsive to the speed of said motor when said motor is operatively connected to a polyphase source of current for varying the rotor resistance to prevent overspeeding of the motor due to said overhauling load throughout a predetermined range, of means for connecting the motor to a single phase source of current in a manner to produce a braking torque on the rotor within a predetermined range of speeds at least partly beyond said first range.

14. A control system for a polyphase induction motor connected to an overhauling load and having a primary and a secondary circuit and arranged to be connected to a source of polyphase power, and comprising an adjustable resistance for the secondary circuit, a master control element movable to several different control positions, means operative when said element is in a first position to set up connections for single phase braking of said motor, means operative when said element is in a second position to connect said motor to said source to cause said motor to exert a torque in the direction of the torque created by said overhauling load and to connect said secondary resistance in said secondary circuit, means responsive to the speed of said motor to short circuit said secondary resistance if the speed of said motor exceeds a predetermined minimum when said element is in said second position, and means responsive to movement of said element to subsequent positions to selectively control the amount of said secondary resistance connected in the secondary circuit, said means which is responsive to the speed of said motor being operable to short circuit portions of said secondary resistance when the speed of the motor exceeds a second predetermined minimum while said element is in said subsequent positions.

15. In a control system for a polyphase induction motor drivingly connected to an overhauling load, a resistor normally included in the rotor circuit, manual means to connect said motor to a source of power in a manner to produce a motor torque to assist said overhauling load, relay means responsive to the speed of said motor at a predetermined speed below synchronous speed to exclude said resistor from said rotor circuit, and manual means operable to include a portion of said resistor in the rotor circuit regardless of the operation of said relay means, said relay means being responsive to the speed of said motor at a predetermined speed above synchronous speed to again exclude said resistor from said rotor circuit.

16. In a braking system for a polyphase induction motor having a primary circuit and secondary circuit and drivingly connected to an overhauling load capable of driving said motor at speeds above synchronism, switching means operable for short circuiting a portion of said primary circuit and for connecting at least a portion of said primary circuit for energization by a single phase current, a secondary resistor, switch means operable to include a predetermined portion of said resistor in said secondary circuit, and means operable while said motor is being driven at speeds above synchronism for effecting operation of said switching means and said switch means, thereby causing a torque to be produced in the motor which is opposite to the torque of said overhauling load.

17. The combination with a three-phase induction motor having a star connected primary winding and a secondary circuit and means for driving said motor at speeds above its induction motor speed, switching means operable for connecting two branches of said star connected primary winding in parallel with each other and both in series with the third branch across a source of single phase current, a secondary resistor, means operable to include a predetermined portion of said resistor in said secondary circuit, and means operable while said motor is being driven at speeds above synchronism for effecting operation of said switching means and said last named means, thereby causing a torque to be produced in the motor which is opposite to the torque of said overhauling load.

18. The combination with a polyphase wound rotor induction motor drivingly connected to an overhauling load and arranged for connection to a polyphase source of current and manual operating means for varying the rotor resistance to control the speed of said motor, of means responsive to the speed of said motor when the motor is operatively connected to a polyphase source of current and rotating at speeds above synchronism for automatically varying the rotor resistance to prevent over-speeding of the motor due to said overhauling load, and manual means operable while the motor is rotating at speeds above synchronism for connecting the motor for energization by a single phase current in a manner to produce a braking torque.

HARRY L. WILCOX.

CERTIFICATE OF CORRECTION.

Patent No. 2,233,501.                                              March 4, 1941.

HARRY L. WILCOX.

It is hereby certified that error appears in the printed specification of the above numbered patent requiring correction as follows: Page 3, first column, line 31, and page 5, second column, line 27, for "12" read --L2--; page 9, first column, line 12, claim 1, for the words "which is a secondary winding connected" read --and a secondary winding which is connected--; and that the said Letters Patent should be read with this correction therein that the same may conform to the record of the case in the Patent Office.

Signed and sealed this 13th day of May, A. D. 1941.

Henry Van Arsdale,
Acting Commissioner of Patents.

(Seal)

DISCLAIMER 2,233,501.—*Harry L. Wilcox*, Cleveland, Ohio. BRAKING SYSYTEM FOR INDUCTION MOTORS. Patent dated Mar. 4, 1941. Disclaimer filed Sept. 23, 1947, by the assignee, *The Electric Controller & Manufacturing Company*.

Hereby enters this disclaimer to claims 1, 12, 16, and 17 in said specification.

[*Official Gazette October 28, 1947.*]